United States Patent
Kass et al.

(10) Patent No.: US 6,589,048 B2
(45) Date of Patent: Jul. 8, 2003

(54) ROLLER CONSTRUCTION FOR OPERATION AT ELEVATED TEMPERATURES

(75) Inventors: Allen Kass, Pittsford, NY (US); Terence Michael Miller, Rochester, NY (US); Rainer J. Bleil, Waeschenbeuren (DE); Jiann-Hsing Chen, Fairport, NY (US)

(73) Assignee: NexPress Solutions LLC, Rochester, NY (US)

( * ) Notice: Subject to any disclaimer, the term of this patent is extended or adjusted under 35 U.S.C. 154(b) by 79 days.

(21) Appl. No.: 09/827,410

(22) Filed: Apr. 6, 2001

(65) Prior Publication Data

US 2002/0146660 A1 Oct. 10, 2002

(51) Int. Cl.$^7$ .................................................. F27B 9/28
(52) U.S. Cl. ........................ 432/60; 432/228; 492/46; 492/47
(58) Field of Search .................... 432/60, 228, 236; 492/46, 47, 48; 219/216

(56) References Cited

U.S. PATENT DOCUMENTS

| | | | | |
|---|---|---|---|---|
| 5,094,613 A | * | 3/1992 | Dolcimascolo et al. | 219/216 |
| 5,649,891 A | * | 7/1997 | Kass et al. | 432/246 |
| 6,377,772 B1 | * | 4/2002 | Chowdry et al. | 399/159 |
| 6,440,048 B1 | * | 8/2002 | Bleil et al. | 228/112.1 |

\* cited by examiner

*Primary Examiner*—Jiping Lu
(74) *Attorney, Agent, or Firm*—Lawrence P. Kessler

(57) ABSTRACT

A roller for use in a fuser assembly of a reproduction apparatus adapted to operate at an elevated temperature up to in the range of approximately 750° F. The roller includes a generally elongated substantially cylindrical tube. End gudgeons are provided for sealing the ends of the cylindrical tube. Each of the end gudgeons is respectively associated with an end of the cylindrical tube such that after a weld joint is formed between the cylindrical tube and the end gudgeon, the end gudgeon provides a compression joint to prevent the cylindrical tube from separating from the end gudgeon, due to material creep, at elevated operating temperatures.

13 Claims, 4 Drawing Sheets

ROLLER CONSTRUCTION FOR OPERATION AT ELEVATED TEMPERATURES

FIELD OF THE INVENTION

This invention relates in general to rollers, for example for use in fuser assemblies of reproduction apparatus, and more particularly to construction of fuser, pressure, or heater rollers capable of operating at elevated temperatures.

BACKGROUND OF THE INVENTION

In reproduction apparatus, such as copier/duplicators and printers for example, fuser rollers or heated rollers are commonly used which include two end caps, which can be made from stainless steel, that are joined to a thermally conductive tube such as aluminum or coppers or alloys of these two materials. There are many known methods for joining the end caps to the tube, such as mechanically bolting, press fit, retaining rings, welding etc. If the end caps and tube are made from the same material, forming techniques such as spinning and swagging can be employed where joining techniques are not required.

Due to its low cost, one of the most commonly methods for joining end caps to tubing is by friction welding. Friction welding consists of either inertia or direct drive friction welding. If the end cap and the tube include materials that are weldable, than a butt type weld design can be used (see EP 0 395 385 published Nov. 31, 1990). If the end cap and the tube include materials that are not readily weldable, than an open dovetail weld design can be used (see U.S. Pat. No. 5,094,613).

The major reasons for the use of prior art open dovetail weld design in joining end caps to tubing (as shown in FIG. 1) is that under prior operating conditions it was found to result in formation of an excellent joint. It is believed that this was due to the fact that during welding the tube material (typically aluminum) is forged into the dovetail during friction welding at a forging temperature of approximately 900° F. to 1100° F. This results in an effective shrink fit. The dovetail configuration then prevents the gudgeon from walking out during operation at prior normal operating temperatures. Furthermore, depending on the materials selected and the friction weld parameters, some surface welding may occur between the two materials at the weld joint to enhance the joint bond.

It has been found, however, that under severe stress conditions, an open dovetail design could result in joint failure if the stresses exceed the yield point of the materials being used. One major component of these stresses is the loading imparted along the length of the roller. Another major component of these stresses is as a result of the differential coefficient of thermal expansion of the two materials from room temperature to fusing core operating temperature. The higher the operating temperature of the fuser roll, the higher the stresses created at the joint due to the differential rates of material expansion.

The two materials most commonly used for rollers of a reproduction apparatus fuser assembly are aluminum for the tube and stainless steel for the gudgeon. With the open dovetail design, at fusing temperature, the aluminum wants to grow away from the gudgeon. As long as material does not yield or fatigue, the weld joint should last forever. For fuser roll cores, where the operating temperature is held under 400° F., the open dovetail design works very well. However, in order to provide satisfactory controllable fusing, particularly with modem color reproduction apparatus, the fuser assembly operating temperatures may exceed 400° F., and extend to approximately 750° F. At such elevated operating temperatures, the aluminum of the tube will start to creep because it has a very low creep strength. Accordingly, the shrink fit will be reduced or completely lost thereby resulting joint failure.

SUMMARY OF THE INVENTION

In view of the above, this invention is directed to a reproduction apparatus fuser assembly roller construction (operable in an environment of between 400° F. and 750° F.) whereby a tube is connected to an end gudgeon in a manner which substantially prevents separation of the roller and end gudgeon. The roller includes a generally elongated substantially cylindrical tube. End gudgeons are provided for sealing the ends of the cylindrical tube. Each of the end gudgeons is respectively associated with an end of the cylindrical tube such that after a weld joint is formed between the cylindrical tube and the end gudgeon, the end gudgeon provides a compression joint to prevent the cylindrical tube from separating from the end gudgeon, due to material creep, at elevated operating temperatures.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENTS

Figure 1:
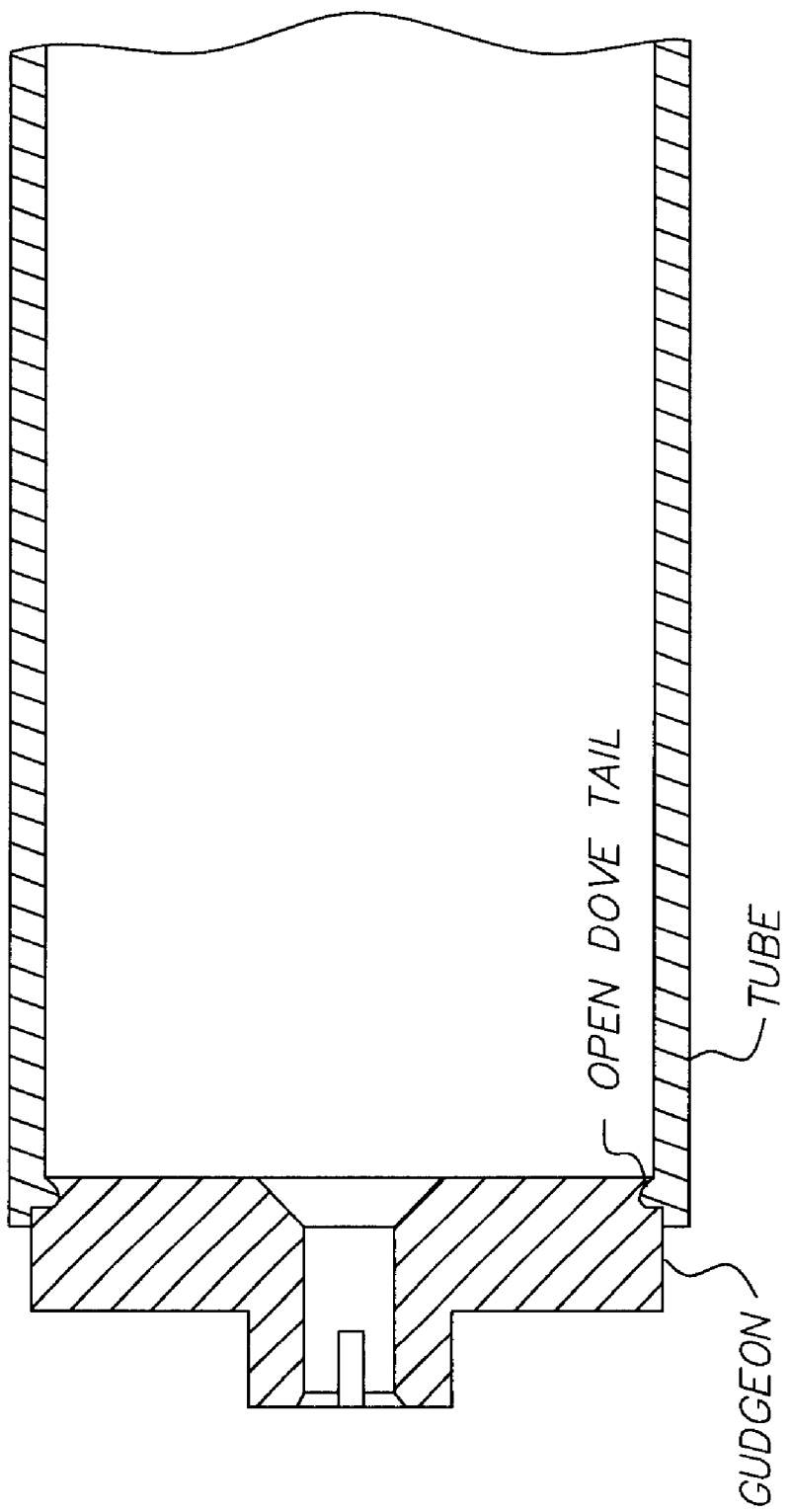
FIG. 1 is a side elevational view, in cross-section, of a roller having an end cap secured to a tube by open dovetail weld joint according to the prior art.
Figure 2:
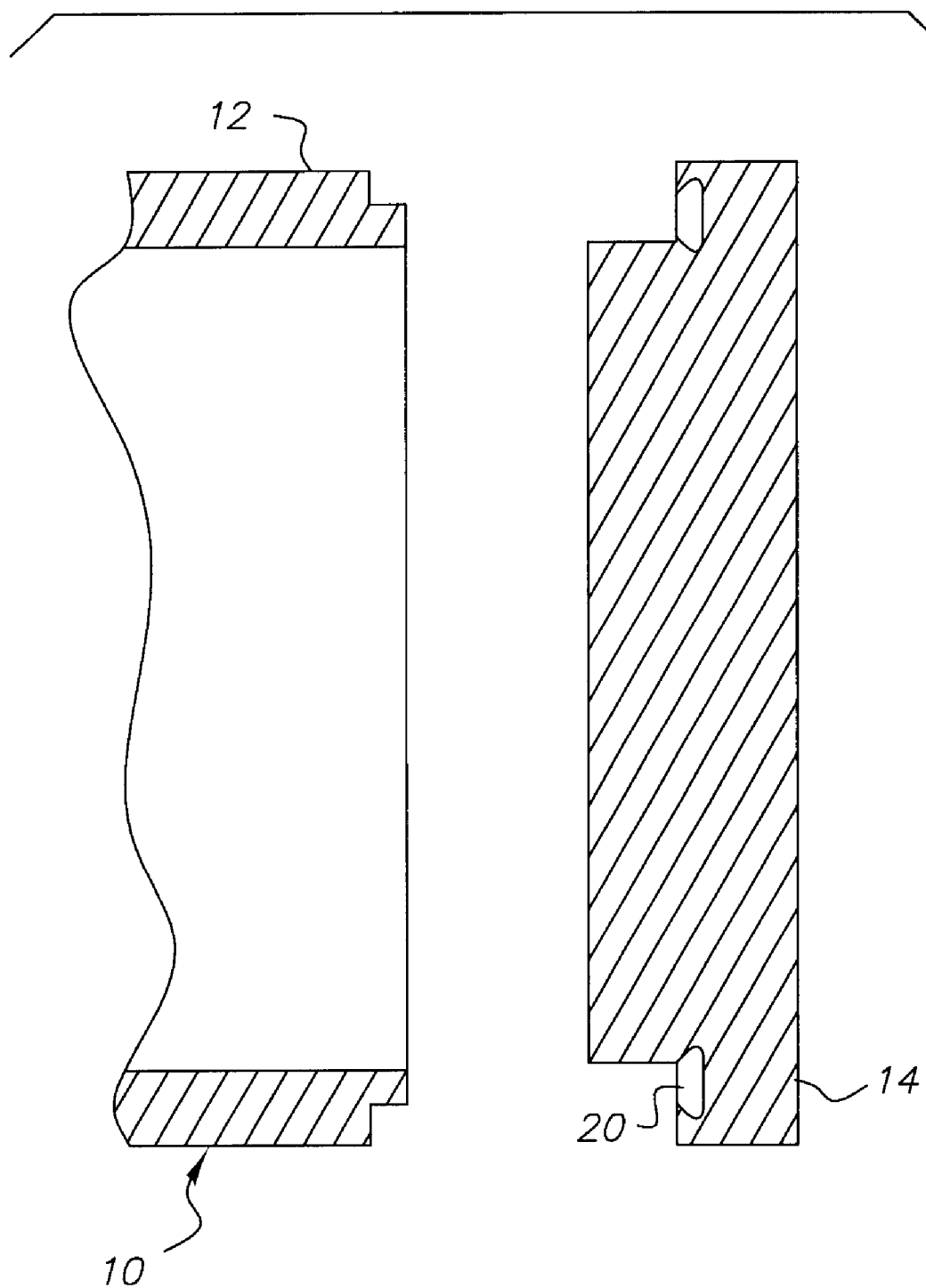
FIG. 2 is a side elevational exploded view, in cross-section, of a tube and an end cap for a roller, the end cap having a parallel closed in double dovetail for forming an improved weld joint according to this invention.
Figure 3:
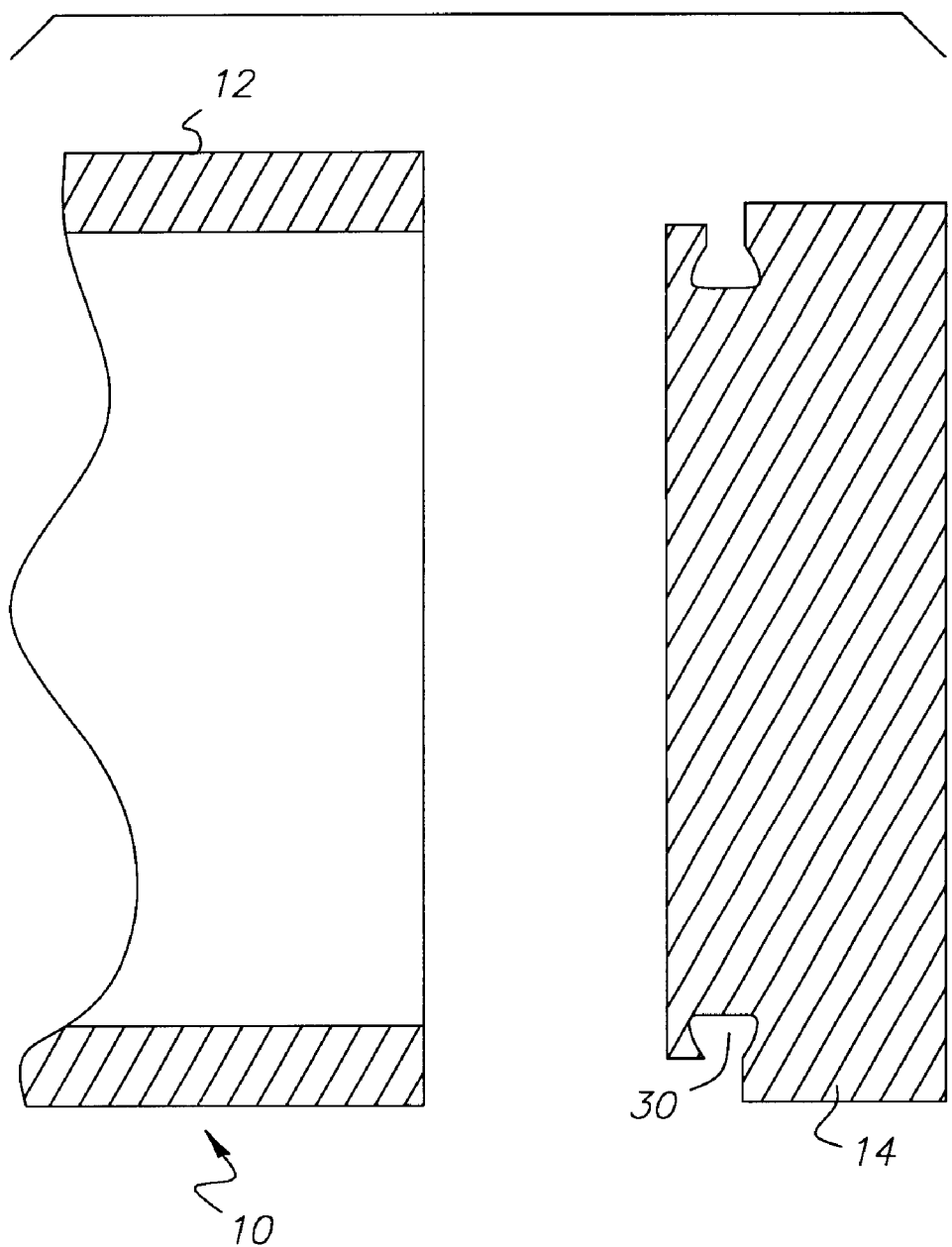
FIG. 3 is a side elevational exploded view, in cross-section, of a tube and an end cap for a roller, similar to FIG. 2, but with the end cap having an alternate embodiment for a perpendicular closed in double dovetail for forming an improved weld joint according to this invention.
Figure 4:
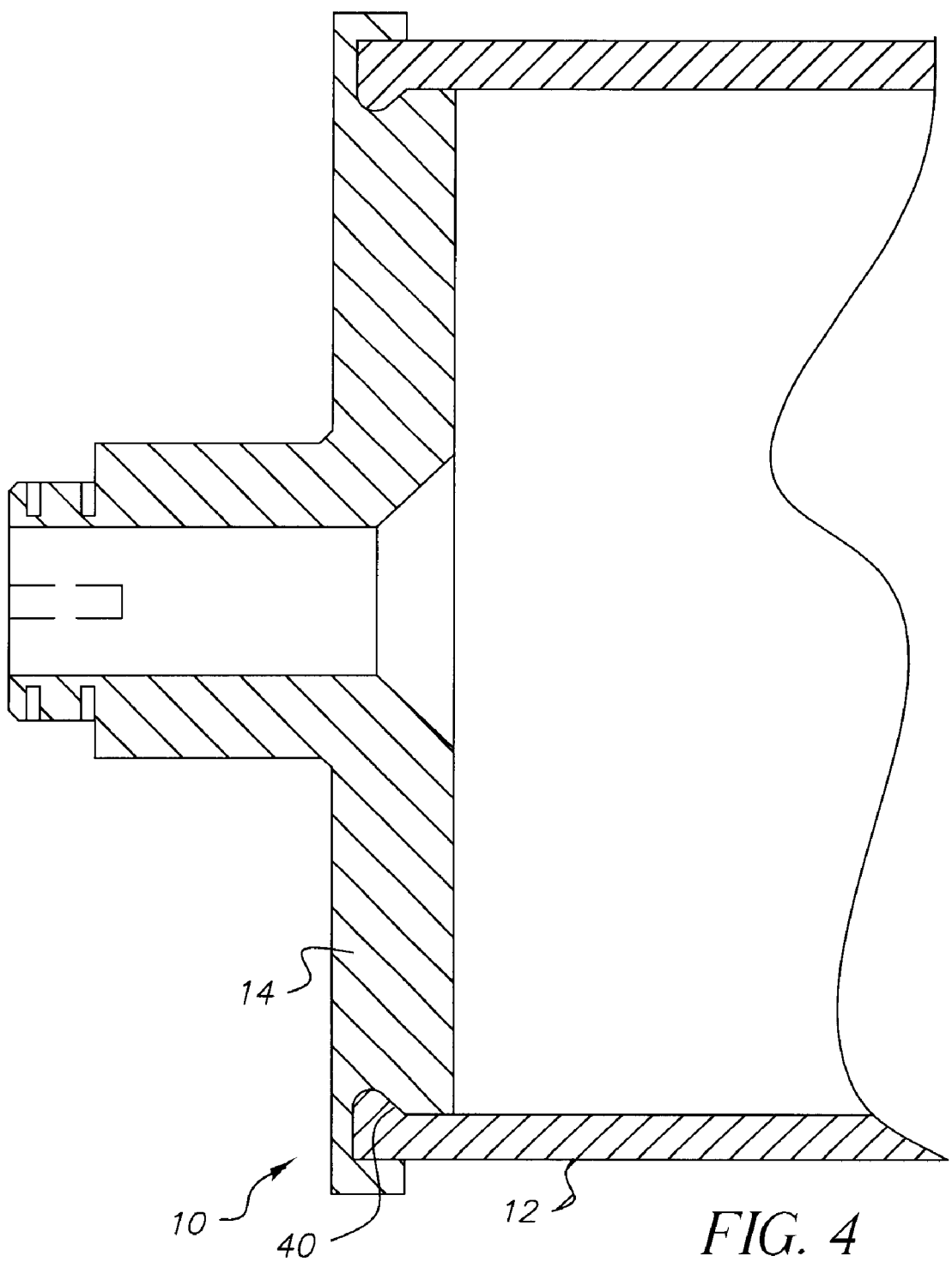
FIG. 4 is a side elevational view, in cross-section, of a tube and an end cap for a roller, similar to FIG. 2, with the end cap and tube joined by the closed in double dovetail forming an improved weld joint according to this invention.

Referring now to the accompanying drawings, FIGS. 2–4 show a roller, designated generally by the numeral 10. In the preferred embodiment, the roller 10 is formed generally as an elongated substantially cylindrical tube 12 having end caps or gudgeons 14 to seal the respective ends of the tube. The roller 10 is typically used for example as a fuser roller or pressure roller of a fuser assembly for fixing marking particle images to receiver members in an electrostatographic reproduction apparatus, or as a heating roller for such fuser roller (see U.S. Pat. No. 4,905,050, issued on Feb. 27, 1990). As such, the roller may include an appropriate coating such as for example any suitable fluroelastomer.

As mentioned above, with regard to modern color reproduction apparatus, the roller 10 may have to operate in an elevated, extremely harsh environment, for example in the range of approximately 400° F. to 750° F. Accordingly, the tube 12 and end gudgeons 14 are formed of materials best suited for the functions that the respective elements are intended to perform. That is, the tube 12 must be readily heat conductive to enable heat to efficiently reach the surface of the tube to perform the fusing operation (i.e., melting the marking particles to enable them to be imbibed into the surface of a receiver member, or heating the external surface of a fuser roller). On the other hand, the end gudgeons 14 are formed of a heat insulating material to prevent heat from escaping from the end of the tube and damaging the support shaft or subjecting other associated elements to excess heat. Also, the gudgeon must exhibit properties of adequate strength and hardness in order to be able to transmit torque and be used as a bearing surface.

As discussed above the roller 10 is typically constructed by welding the end gudgeons 14 to the tube 12, with the common welding technique being a friction weld joint. At the elevated harsh environmental conditions, prior art friction welds are subject to failure. According to this invention, the friction weld joint is made with the provision of a closed in dovetail. In the drawings, in FIG. 2 the closed in dovetail is designated by the numeral 20, in FIG. 3 the closed in dovetail is designated by the numeral 30, and in FIG. 4 the closed in dovetail is designated by the numeral 40. The purpose of the closed in dovetail weld joint is to substantially prevent expansion of the tube 12 away from the gudgeon 14. The closed in dovetail prevents relaxation of the shrink fit, due to creep, by putting the entire joint in compression at the elevated temperatures. Previously, the joint was in tension due to differential material coefficient of thermal expansion, thus leading to element separation and joint failure. Thereby, the life of the roller for fuser rollers that operate in the above noted range of between approximately 400° F. and 750° F. will be substantially extended. This is critical since fuser rollers of this type are typically recycled (i.e., the rollers have a new appropriate surface coating applied when the original coating wears out) in order to keep overall reproduction apparatus operating costs down.

In a preferred embodiment, the fuser roll tube 12 is made of a material with a substantially different coefficient of thermal expansion (CTE) than the material from which the gudgeon 14 is made. The general operating temperature of the fuser roll core in this example is in the range of between approximately 400° F. and 750° F. Particularly, the tube material may be aluminum which has a CTE of $13 \times 10^{-6}$ in/in/° F., while the gudgeon material is type 304 stainless steel (or series 200 or 300 stainless steel) which has a CTE of $9.6 \times 10^{-6}$ in/in/° F. As such, the coefficient of thermal expansion of the tube material is substantially greater than that of the gudgeon.

The weld joint according to this invention includes a closed in dovetail. That is, the dovetail is configured to retain the aluminum tube 12 and substantially prevent it from expanding away and separating from the stainless steel gudgeon 14. FIGS. 2 and 3 are exploded views so as to facilitate viewing of the closed in dovetails. As shown in FIG. 2, the closed in dovetail 20 is a double dovetail parallel to the longitudinal axis A of the gudgeon 14. When the friction weld is formed, material from the end of the tube 12 will flow into the double areas of the dovetail. Then on operation of the roller 10 at elevated temperatures (in the range of between approximately 400° F. and 750° F.), the portion of the gudgeon outboard of the dovetail will substantially prevent the tube from separating from the gudgeon. As shown in FIG. 3, the closed in dovetail 30 is a double dovetail perpendicular to the longitudinal axis A of the gudgeon 14. Again, when the friction weld is formed, material from the end of the tube 12 will flow into the double areas of the dovetail. Then on operation of the roller 10 at the noted elevated temperatures, the portion of the gudgeon outboard of the dovetail will similarly substantially prevent the tube from separating from the gudgeon. As such, it is clear that the closed in dovetail prevents relaxation of the shrink fit, due to creep, by putting the entire joint in compression at the elevated temperatures.

FIG. 4 shows the tube 12 assembled and friction welded to the gudgeon 14 by a single parallel dovetail 40. Similarly to the above description, when the friction weld is formed, material from the end of the tube 12 will flow into the area of the dovetail. Then on operation of the roller 10 at the noted elevated temperatures, the portion of the gudgeon outboard of the dovetail will similarly substantially prevent the tube from separating from the gudgeon.

In an alternative preferred embodiment, with the friction weld joint having a closed in dovetail according to this invention, the materials selected for the tube 12 and the gudgeon 14 may be different but have substantially matching coefficients of thermal expansion. That is, for example, using copper or copper base alloys may be used as material for the tube 12, and 200, 300, or 400 Series stainless steel (particularly type 304 stainless steel) may be used as material for the gudgeon 14. The coefficient of thermal expansion of these two materials are about the same (CTE of copper is $10 \times 10^{-6}$ in/in/° F., and CTE of type 304 stainless steel is $9.6 \times 10^{-6}$ in/in/° F.). Many copper alloys (e.g., C122000), when exposed to temperatures between approximately 400° F. and 750° F., form an oxide layer that does not adhere to the substrate and thus flake off. This is detrimental to internal heated rollers where the heat source (such as for example a quartz lamp) receives the copper oxide flakes. This results in a substantial reduction in lamp efficiency and life. Accordingly, it is desired to select a copper alloy which has a stable oxide layer which does not show a propensity to flake off. An example of such a copper alloy is C21000, which is a copper with 5% zinc. Another benefit of selecting a copper alloy with a stable oxide layer is that many elastomers, such as silicone rubbers, exhibit an excellent bond to the oxide layer, where such elastomers do not bond well to unoxidized copper.

Thus, at start up of the fuser roller 10, the copper tube 12 would come up to temperature quickly compared to the stainless steel gudgeon 14. Accordingly, the closed in dovetail weld joint still functions to prevent high (failure-inducing) stresses in the joint, such as would have be induced when aluminum is used (due to aluminum having a much higher coefficient of thermal expansion than the specified stainless steel). Accordingly, similarly to the manner discussed above, the tube 12 is substantially prevented from separating from the gudgeon 14. In addition, it should be pointed out that copper and stainless material elements can be joined by other welding techniques such as arc welding, braze welding, or brazing. An additional advantage of using copper compared to aluminum is that the mechanical properties (e.g. creep strength) of copper alloys in the operating range of between approximately 400° F. and 750° F. is significantly higher compared to aluminum alloys. Moreover, copper or copper alloy tubing, having higher thermal conductivity than aluminum, serves to substantially improve fuser roller (and reproduction apparatus) overall performance.

The invention has been described in detail with particular reference to preferred embodiments thereof, but it will be understood that variations and modifications can be effected within the spirit and scope of the invention.

What is claimed is:

1. A roller for use in a fuser assembly of a reproduction apparatus adapted to operate at an elevated temperature up to in the range of approximately 750° F., said roller comprising:

a generally elongated substantially cylindrical tube; and end gudgeons for sealing the ends of said cylindrical tube, each of said end gudgeons respectively associated with an end of said cylindrical tube such that after a weld joint is formed between said cylindrical tube and said end gudgeon, said end gudgeon provides a compression joint to prevent said cylindrical tube from separating from said end gudgeon, due to material creep, at elevated operating temperatures, and said respective end gudgeons are associated with said cylindrical tube by defining a closed in dovetail.

2. The roller according to claim 1 wherein said closed in dovetail is parallel to the longitudinal axis of said gudgeon.

3. The roller according to claim 2 wherein said closed in dovetail is a double dovetail.

4. The roller according to claim 1 wherein said closed in dovetail is perpendicular to the longitudinal axis of said gudgeon.

5. The roller according to claim 4 wherein said closed in dovetail is a double dovetail.

6. The roller according to claim 1 wherein said tube is formed of a material having a substantially different coefficient of thermal expansion than the coefficient of thermal expansion of said gudgeon.

7. The roller according to claim 6 wherein said coefficient of thermal expansion of said tube is substantially greater than the coefficient of thermal expansion of said gudgeon.

8. The roller according to claim 7 wherein said tube material is aluminum and said gudgeon material is stainless steel.

9. The roller according to claim 7 wherein said tube material is an aluminum alloy and said gudgeon material is stainless steel.

10. The roller according to claim 1 wherein said coefficient of thermal expansion of said tube is substantially equal to the coefficient of thermal expansion of said gudgeon.

11. The roller according to claim 10 wherein said tube material is copper and said gudgeon material is stainless steel.

12. The roller according to claim 10 wherein said tube material is a copper alloy and said gudgeon material is stainless steel.

13. The roller according to claim 12 wherein said tube material is a copper alloy C21000.

* * * * *